Oct. 6, 1925.
H. C. YOUNG ET AL
1,556,141
PROCESS AND APPARATUS FOR MASTICATING RUBBER
Filed Jan. 31, 1924  2 Sheets-Sheet 1
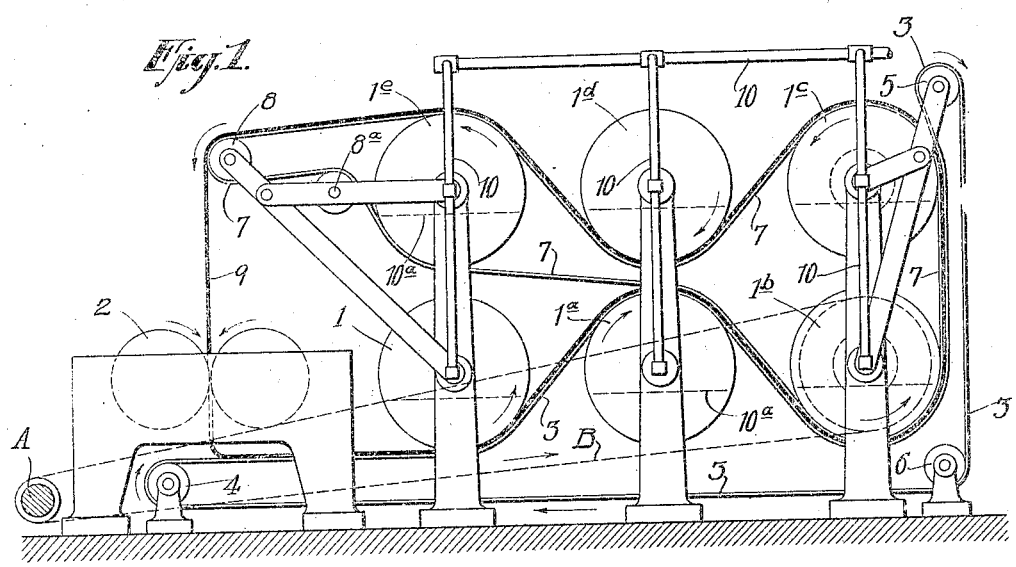
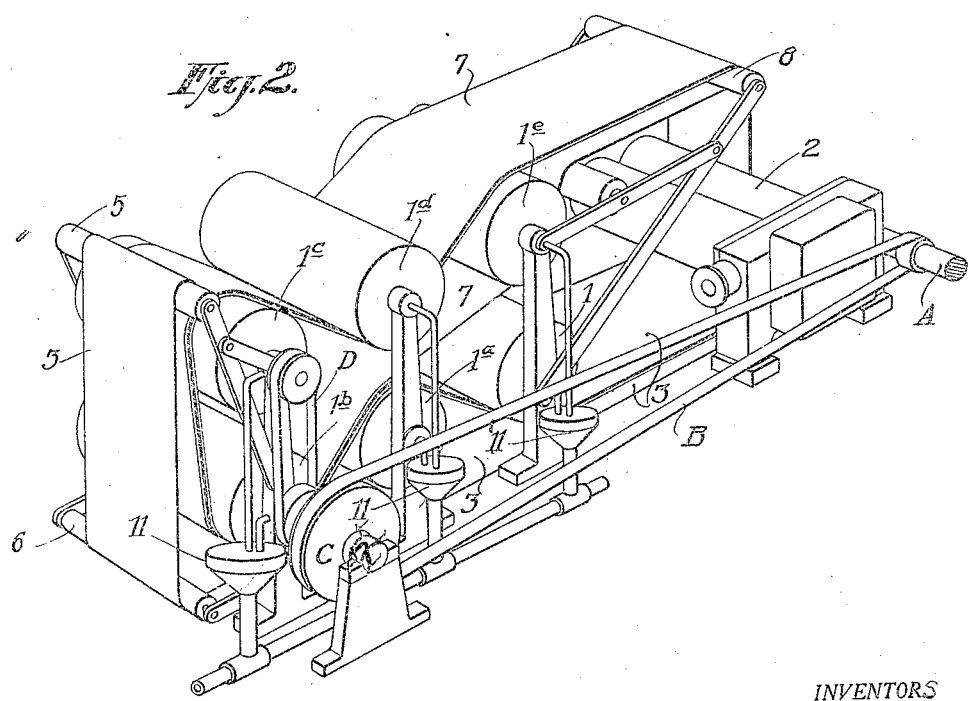
INVENTORS
HARRY CLARANCE YOUNG
COLIN MACBETH
BY
Anthony Usina
ATTORNEY.

Oct. 6, 1925.  
H. C. YOUNG ET AL  
1,556,141  
PROCESS AND APPARATUS FOR MASTICATING RUBBER  
Filed Jan. 31, 1924  2 Sheets-Sheet 2
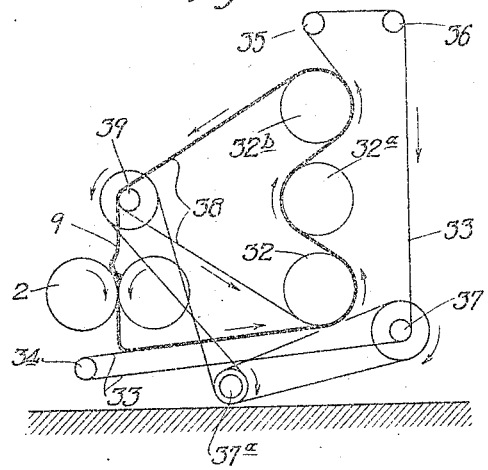
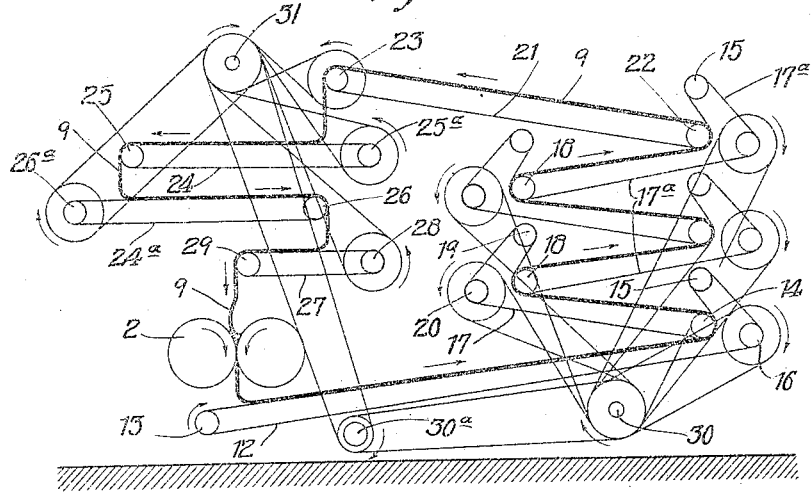
INVENTORS  
HARRY CLARANCE YOUNG  
COLIN MACBETH  
BY  
*D. Anthony Usina*  
ATTORNEY.

Patented Oct. 6, 1925.

1,556,141

UNITED STATES PATENT OFFICE.

HARRY CLARANCE YOUNG, OF SUTTON, AND COLIN MACBETH, OF FOUR OAKS, ENGLAND, ASSIGNORS TO DUNLOP TIRE AND RUBBER CORPORATION OF AMERICA, OF BUFFALO, NEW YORK, A CORPORATION OF NEW YORK.

PROCESS AND APPARATUS FOR MASTICATING RUBBER.

Application filed January 31, 1924. Serial No. 689,822.

*To all whom it may concern:*

Be it known that we, HARRY CLARANCE YOUNG and COLIN MACBETH, subjects of the King of Great Britain, residing in Sutton, in the county of Warwick, England, and Four Oaks, in the county of Warwick, England, respectively, have invented certain new and useful Improvements in Processes and Apparatus for Masticating Rubber, of which the following is a specification.

Raw rubber for use in manufacture after being washed is masticated to render it soft and pliable. To effect this end it is passed between rollers in a masticating mill. To obtain the best results it is essential that the rubber should pass through the masticating mill a number of times, being cooled down between each operation. The process, therefore, takes a considerable time.

According to this invention the rubber after passing through the masticating mill or rolls is automatically cooled and returned for a second mastication, this operation being repeated until the mastication is carried to the required degree, when the rubber is withdrawn. In the machine illustrated the rubber is placed between the rolls of a masticating mill and after the same has been rendered pliable it falls in the form of a sheet on to a moving belt or conveyor which is situated directly underneath the rolls of the mill. The belt conveys the rubber over or under a series of drums or rollers which are preferably provided with suitable cooling means. The rubber may, however, be cooled by exposure to the air upon the belt. When the rubber has traversed the full number of drums the belt is arranged so as to allow it to fall into the nip of the rollers of the masticating mill. The general arrangement and the number of the cooling drums may be varied as desired, that is they may be arranged on the ground level, or, where economy in floor space is of importance, the drums may be arranged vertically one on top of another, the belt following a zig-zag course.

The accompanying drawings illustrate an embodiment of the invention.

Fig. 1 is a side elevation of one form of the apparatus, wherein the rubber is passed over drums provided with cooling means;

Fig. 2 is a perspective view of the same from the opposite side;

Fig. 3 is a side elevation of a form of the apparatus wherein rollers are employed without specific cooling means;

Fig. 4 is a side elevation of a modification of the apparatus shown in Fig. 1 wherein the cooling drums are vertically disposed.

With reference to Figs. 1 and 2, a series of six cooling drums 1, 1$^a$, 1$^b$, 1$^c$, 1$^d$, 1$^e$ are arranged in two rows of three in a convenient position with regard to the masticating mill 2. An endless belt or conveyor 3 which is made of such material as to allow heat to escape readily is arranged over rollers 4, 5 and 6. That portion of the belt between the rollers 4 and 5 is conveyed under the drum 1, over the drum 1$^a$ and under the drum 1$^b$, and upwards to the roller 5, travelling over the surface of the drum 1$^c$. A second belt 7 moves from a roller 8 and a tension roller 8$^a$ to the underside of the drum 1$^c$, meeting the belt 3 on the top of the drum 1$^a$, the two belts then travel under the drum 1$^b$ and upwards to the drum 1$^c$ when the belt 3 is taken away by the roller 5. The belt 7 passes over the top of the drum 1$^c$ and under the drum 1$^d$ and over the drum 1$^e$. It is then carried along to the roller 8 situated immediately above the nip of the rolls of the masticating mill.

The rubber 9 having passed through the masticating mill falls in the form of a sheet on to the belt 3 which carries the rubber under the drum 1 and over the roll 1$^a$, where it is joined by the belt 7. It is then conveyed between the belts 3 and 7 under the drum 1$^b$ and up to the drum 1$^c$ where the belt 3 is taken off by the roller 5. The rubber then lies on the surface of the belt 7 and is conveyed over the drum 1$^c$ and under the drum 1$^d$ and then upwards over the roll 1$^e$ to the roller 8, so that it falls into the nip of the rolls of the masticating mill.

Driving means are provided from the main shaft A of the masticating mill by means of an open belt B to a pulley C situated at one end of the shaft of the drum 1$^b$; and a belt D drives the drum 1$^c$ from the shaft of the drum 1$^b$. The driven drums drive the conveyor belts 3 and 7 and these in turn frictionally drive the drums 1, 1$^a$, 1$^d$ and 1$^e$.

Means may be provided for circulating cooling fluid through the drums. In the method shown in Figs. 1 and 2 water is admitted to each drum separately through the pipes 10 at one side of the machine to the levels 10ª. At the opposite ends of the drums the water is siphoned from the drums into the vessels 11 at precisely the rate at which it is admitted to the said drums, so maintaining a constant flow at levels 10ª.

A platform is preferably erected over the moving belt 3 between the drums and the masticating mill on which the operator may stand, but this is not shown.

With reference to Fig. 3, an endless belt or conveyor 12 travels over a roller 13 which is situated under the rolls 2 of a masticating mill and round a roller 14. It is then taken away by a roller 15 and passes over a roller 16 back to the roller 13. A further belt or conveyor 17 travels from the roller 14 round the roller 18 and is then taken away by the roller 19 passing round the roller 20 back to the roller 14. A further belt or series of belts 17ª moving in similar manner to the belt 17 may be arranged to form an upward zig-zag course as shown. An endless belt or conveyor 21 travels from the roller 22 to the roller 23. Below the roller 23 a further endless belt or conveyor 24 is situated, travelling in a horizontal direction about the rollers 25 and 25ª. Underneath the belt 24 a further belt or series of belts 24ª may be placed. The belts 24 and 24ª moving in opposite directions horizontally. A further belt 27 travels from the roller 28 to the roller 29 which is situated immediately above the nip of the rolls 2 of the masticating mill.

The rubber 9 having passed through roll 2 of the masticating mill falls on to the belt 12 and is conveyed up to and round the roller 14, the rubber then lies on the surface of the belt 17 and is conveyed round the rolls 18 on to the belt 17ª. A series of belts 17 and 17ª may be provided as desired, causing the rubber to take an upward zig-zag course. On reaching the roller 22 the rubber is conveyed by the belt 21 to the roller 23 where it is allowed to drop on to the belt 24. The belt 24 conveys the rubber to the roller 25 where the said rubber is allowed to fall on to the belt 24ª and is conveyed in the opposite direction to the roller 26. A series of belts 24 and 24ª may be provided as desired causing the rubber to be conveyed downwards in a series of opposite horizontal directions. On falling on to the belt 27 the rubber is conveyed to the roller 29 and is allowed to drop into the nip of the rolls 2 of the masticating mill.

Driving means may consist of a shaft 30 driven with an open belt from the shaft 30ª driving the masticating mill, having a series of pulleys connected by crossed belts to the rollers 20 and by open belts to the rollers 16. The shaft 30 is preferably situated underneath the belts taking the rubber in an upward course. A further shaft 31, also driven from the main drive 30ª by an open belt, is situated above the belts taking the rubber in a downward course and has a series of pulleys connected by crossed belts to the rollers 23, 25ª and 28, and by an open belt to the roller 26ª.

With reference to Fig. 4, three cooling drums 32, 32ª and 32ᵇ are arranged vertically one above another. The drums may be cooled by circulating water therethrough substantially in the manner described for Fig. 1, but this is not shown in the drawings. An endless belt or conveyor 33 travels from a roller 34 which is situated underneath the rollers 2 of a masticating mill, around the cooling drum 32 and upwards in a zig-zag course round the drums 32ª and 32ᵇ, whence it is taken off by a roller 35 carried by means of rollers 36 and 37 back to the roller 34. A further endless belt or conveyor 38 travels from a roller 39 and meets the belt 33 under the cooling drum 32, travelling upwards round the drums 32ª and 32ᵇ in an upward zig-zag direction. Having left the drum 32ᵇ, it returns to the roller 39 which is situated immediately above the nip of the rollers 2 of the masticating mill.

The rubber 9 having passed through the rollers 2 of the masticating mill falls in sheet form on to the belt 33 and is conveyed to the cooling drum 32 where it is met and held by the belt 38. The rubber is then conveyed between the two belts 33 and 38 in an upward zig-zag course about the cooling drum 32, 32ª and 32ᵇ. Having reached the top of the drum 32ᵇ the belt 33 is led off by means of the pulley 35 and the rubber 9 lies upon the surface of the belt 38 and is conveyed down to the roller 39. It is then allowed to fall into the nip of the rolls 2 of the masticating mill.

Driving means may be provided, such as an open belt from the main driving shaft 37ª of the masticating mill to a pulley mounted at one end of the roller 37 and a crossed belt to a similar pulley mounted at one end of the roller 39.

The whole arrangement of the travelling belts and cooling drums may be either an integral portion of the masticating mill, or may be arranged separately in a convenient position on a suitable stand. It will be understood that we do not limit ourselves to the particular number or arrangement of cooling drums shown in the drawings.

Though we have described with great particularity of detail certain embodiments of our invention, yet it will be understood that the invention is not restricted to the particular embodiments shown. Various modifications may be made in detail and in the arrangement of the parts without departing from the invention as defined in the following claims.

What we claim is:—

1. The method of treating raw rubber which consists in masticating it a number of times and passing it automatically, between each masticating operation to and through a cooling mechanism to the next mastication.

2. The method of treating raw rubber which consists in masticating it and converting it into sheet form and passing it automatically in such form around cooling rollers to a point where it is again masticated, and repeating such operations to the desired extent.

3. An apparatus for treating raw rubber comprising a masticating mill and a conveyor receiving it from said mill and passing it through cooling mechanism continuously to a point where it is to be again masticated.

4. An apparatus for treating raw rubber comprising a masticating mill and a conveyor receiving it from said mill and passing it through cooling mechanism continuously to the entrance of said masticating mill.

5. The apparatus of claim 3, the cooling mechanism including drums with means for circulating a cooling fluid therethrough.

6. The apparatus of claim 3, the cooling mechanism including rollers and belts for carrying the rubber over said rollers.

7. The apparatus of claim 3, the cooling mechanism including rollers and a pair of belts embracing the rubber and conveying it to and over said rollers.

8. The apparatus of claim 3, the cooling mechanism including rollers arranged one above another.

9. An apparatus for treating raw rubber comprising a masticating mill and a conveyor receiving it from said mill and passing it through cooling mechanism continuously to a point where it is to be again masticated, the cooling mechanism including rollers arranged one above another, and a pair of belts embracing the rubber and conveying it upward to the successive vertically arranged rollers.

In witness whereof, we have hereunto signed our names.

HARRY CLARANCE YOUNG.
COLIN MACBETH.